(12) United States Patent
Hillyard et al.

(10) Patent No.: US 9,177,565 B2
(45) Date of Patent: Nov. 3, 2015

(54) OPTIMIZED ARCHITECTURE FOR STREAMING AUDIO APPLICATIONS

(71) Applicant: BROADCOM CORPORATION, Irvine, CA (US)

(72) Inventors: Jason Hillyard, San Diego, CA (US); Robert William Hulvey, Redondo Beach, CA (US); John Walley, Ladera Ranch, CA (US); Victor Zhodzishsky, North Potomac, MD (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/621,353

(22) Filed: Feb. 12, 2015

(65) Prior Publication Data

US 2015/0162015 A1    Jun. 11, 2015

Related U.S. Application Data

(63) Continuation of application No. 11/215,420, filed on Aug. 20, 2005, now Pat. No. 8,989,661.

(51) Int. Cl.
| | |
|---|---|
| *H04B 7/00* | (2006.01) |
| *G10L 19/02* | (2013.01) |
| *H04W 28/06* | (2009.01) |
| *G10L 19/00* | (2013.01) |
| *H04L 29/06* | (2006.01) |
| *G10L 19/03* | (2013.01) |
| *H04N 21/233* | (2011.01) |
| *H04W 4/00* | (2009.01) |
| *H04W 76/02* | (2009.01) |
| *H04W 80/00* | (2009.01) |
| *H04W 84/18* | (2009.01) |

(52) U.S. Cl.
CPC ............. *G10L 19/0208* (2013.01); *G10L 19/00* (2013.01); *G10L 19/0019* (2013.01); *G10L 19/03* (2013.01); *H04L 29/06027* (2013.01); *H04L 65/4092* (2013.01); *H04L 65/602* (2013.01); *H04L 65/607* (2013.01); *H04N 21/233* (2013.01); *H04W 4/008* (2013.01); *H04W 28/06* (2013.01); *H04W 76/02* (2013.01); *H04W 80/00* (2013.01); *H04W 84/18* (2013.01)

(58) Field of Classification Search
USPC ............ 455/41.2, 556.1, 556.2, 90.1, 95, 39, 455/66.1, 41.3, 67.11, 503, 515, 574, 127.5, 455/343.1, 343.5
See application file for complete search history.

(56) References Cited

U.S. PATENT DOCUMENTS

| | | |
|---|---|---|
| 5,923,761 A | 7/1999 | Lodenius |
| 7,051,356 B2 | 5/2006 | Weinstein |

(Continued)

FOREIGN PATENT DOCUMENTS

| | | |
|---|---|---|
| EP | 1161064 A2 | 12/2001 |
| EP | 1168883 A2 | 1/2002 |

*Primary Examiner* — Dominic E Rego
(74) *Attorney, Agent, or Firm* — McDermott Will & Emery LLP

(57) ABSTRACT

Methods and systems for processing data disclosed herein includes, in a transceiver chip comprising at least one on-chip processor, compressing, by the at least one on-chip processor, audio information received by the transceiver chip. The compressing utilizes an on-chip audio codec implemented within said at least one on-chip processor. The at least one on-chip processor determined, within said transceiver chip, a frame size of at least one audio frame comprising the compressed audio information.

20 Claims, 11 Drawing Sheets

(56) References Cited

U.S. PATENT DOCUMENTS

| | | |
|---|---|---|
| 2001/0017853 A1 | 8/2001 | Kikuchi et al. |
| 2003/0149810 A1 | 8/2003 | Kawamura |
| 2003/0152056 A1 | 8/2003 | Lee et al. |
| 2004/0134989 A1 | 7/2004 | Meier et al. |
| 2005/0020299 A1 | 1/2005 | Malone et al. |
| 2005/0040350 A1 | 2/2005 | Lapstun et al. |
| 2005/0181826 A1 | 8/2005 | Yueh |
| 2005/0208893 A1 | 9/2005 | Yueh |
| 2005/0213544 A1 | 9/2005 | Kikuchi et al. |
| 2006/0062400 A1 | 3/2006 | Chia-Chun |
| 2006/0084383 A1 | 4/2006 | Ibrahim et al. |
| 2006/0114861 A1 | 6/2006 | Kikuchi et al. |
| 2006/0148405 A1 | 7/2006 | Wu et al. |
| 2006/0205362 A1 | 9/2006 | Chang et al. |
| 2006/0270347 A1 | 11/2006 | Ibrahim et al. |
| 2007/0015485 A1 | 1/2007 | DeBiasio et al. |
| 2008/0298613 A1 | 12/2008 | Slamka et al. |
| 2010/0304728 A1 | 12/2010 | Silverbrook et al. |

OPTIMIZED ARCHITECTURE FOR STREAMING AUDIO APPLICATIONS

CROSS-REFERENCE TO RELATED APPLICATIONS/INCORPORATION BY REFERENCE

This application claims the benefit of priority under 35 U.S.C. §120 from U.S. patent application Ser. No. 11/215,420 filed Aug. 30, 2005, which is incorporated herein by reference in its entirety.

FIELD OF THE INVENTION

Certain embodiments of the invention relate to communication devices. More specifically, certain embodiments of the invention relate to a method and system for an optimized architecture for wireless streaming audio applications.

BACKGROUND OF THE INVENTION

Bluetooth® wireless technology is set to revolutionize personal connectivity by providing freedom from wired connections. Bluetooth® is a specification for a small form-factor, low-cost radio solution providing links between mobile computers, mobile phones and other portable and handheld devices.

Bluetooth® wireless technology is an international, open standard for allowing intelligent devices to communicate with each other through wireless, short-range communications. This technology allows any sort of Bluetooth® compliant device—from computers and cell phones to keyboards and headphones—to make its own connections, without wires, cables or any direct action from a user. Bluetooth® is currently incorporated into numerous commercial products including laptops, PDAs, cell phones, and printers, with more products coming out every day.

Bluetooth devices, such as mobile phones and PDAs, are evolving to become more complex as such devices may be adapted to transmit and receive audio information. For example, a Bluetooth® device may utilize a coder/decoder (CODEC) to encode audio information prior to communicating the encoded information to another Bluetooth® device, for example. Similarly, the CODEC may be utilized to decode encoded audio information received from another Bluetooth® device.

In conventional Bluetooth® enabled handheld devices having an integrated Bluetooth® chip, the low-complexity sub-band CODEC (SBC) encoder runs on the handheld's main processor. As a result, the Bluetooth® encoding process utilizes valuable main processor resources, which may otherwise be utilized for handling other tasks being run on the handheld device. In these conventional handheld devices, such as cellular telephones, the handheld device must have sufficient additional processing power to handle tasks associated with encoding SBC audio. As a result of this requirement, cheaper handheld devices that lack adequate processing power are eliminated from ever handling SBC audio encoding. The same is true for other CODECs other than SBC that may be utilized for Bluetooth®.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an optimized architecture for Bluetooth streaming audio applications, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for optimized architecture for Bluetooth streaming audio applications. One aspect of the invention provides streaming audio over Bluetooth® to a Bluetooth® enabled device. In this regard, the optimized architecture utilizes the Bluetooth® chip, which may be integrated in a Bluetooth® enabled device, to directly handle SBC encoding of audio data. Since SBC encoding is done directly within the Bluetooth® enabled device, the resulting internally encoded audio data may be directly interfaced via the Bluetooth® protocol to externally enabled Bluetooth® devices, such as a Bluetooth® headset or to internal devices with the handset.

In another embodiment of the invention, in this configuration, the Bluetooth® chip may provide hardware acceleration of the SBC encoding process. The Bluetooth® chip may be adapted to receive input audio signals from a standard pulse code modulation (PCM) wired CODEC interface such as a standard hardware stereo PCM interface. The Bluetooth® chip may accelerate SBC encoding of the input audio signals in hardware, rather than software, thereby freeing up processing resources that would normally be utilized for SBC audio encoding by a main processor.

Figure 1:
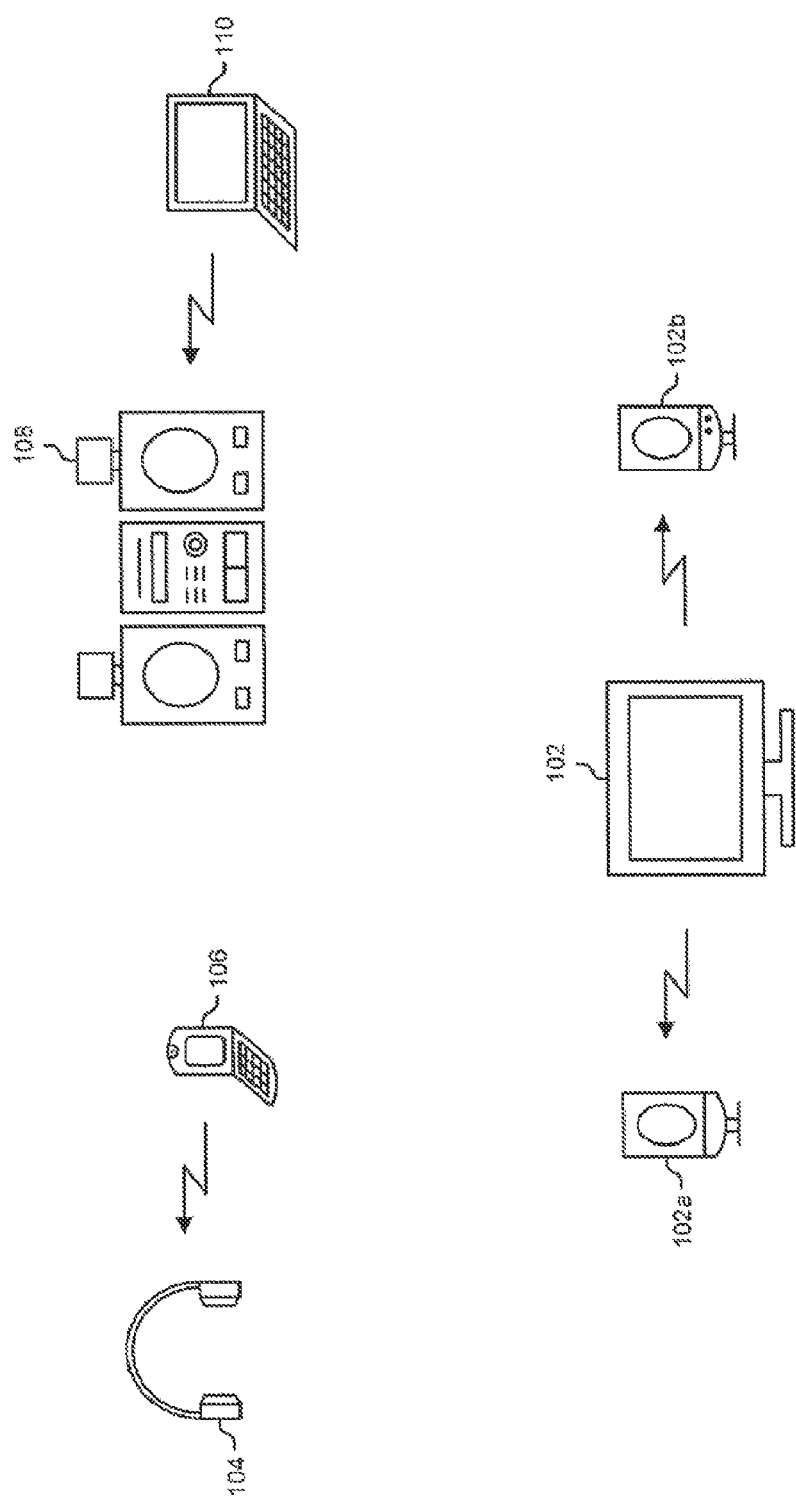
FIG. 1 is a diagram illustrating some examples of Bluetooth® (BT) streaming audio devices.

FIG. 1 is a diagram illustrating some examples of Bluetooth® (BT) streaming audio devices. Referring to FIG. 1, there is shown a stereo headset 104, a mobile phone 106, a Bluetooth®-enabled stereo system 108, personal computers (PC) 110 and 102, and stereo speakers 102a and 102b. The stereo headset 104 may receive streaming audio from MP3 files stored on the mobile phone 106. The headset 104 may also function as a normal Bluetooth® telephony headset for phone calls. The Bluetooth®-enabled stereo system 108 may receive streaming audio from MP3 files stored on the PC 110, solving the problem of how to get the MP3's from the PC 110 to the stereo system 108. The PC 102 may play stereo audio to the pair of Bluetooth® wireless speakers 102*a* and 102*b*, thus freeing the desktop from wired clutter.

The Bluetooth® protocol utilizes a frequency hopping spread spectrum (FHSS) radio system operating in the 2.4 GHz unlicensed band. Its low power transmissions allow a typical range of about 10 meters. Devices may connect to each other to form a network known as a piconet, with up to seven active devices in the piconet. The maximum data throughput between devices may be between 2.0 and 3.0 megabits per second (Mbps), with the data capacity shared between devices on the piconet.

The Bluetooth® protocol utilizes a protocol stack to transfer data and to implement various advanced features that may be required by various applications. The Bluetooth® protocol stack may comprise a plurality of different protocols designed for different purposes. Various profiles, or applications, may reside above the protocol stack, and utilize the services that are offered by the Bluetooth® protocol stack. The Bluetooth® protocol may also comprise a lower protocol stack for link management and baseband control.

One or more of the protocols within the Bluetooth® protocol stack, may reside within a host device, such as a Bluetooth® enabled device. Other protocols within the Bluetooth® protocol stack, such as protocols within the lower Bluetooth® protocol stack, may reside within the Bluetooth® chip. In this regard, SBC encoding, or compression of audio data may be transferred from the upper Bluetooth® protocol stack to the lower Bluetooth® protocol stack residing on the Bluetooth® chip. Consequently, processing resources handled by a host processor within the Bluetooth® enabled device may be freed and allocated for other purposes.

Figure 2:
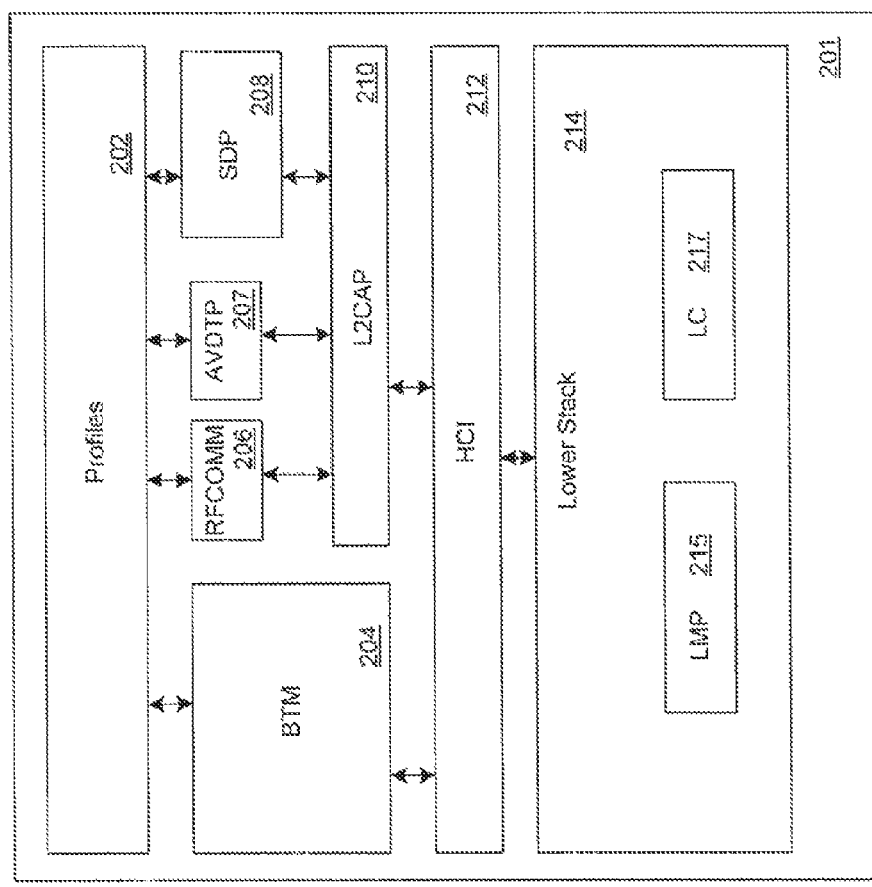
FIG. 2 is a simplified exemplary protocol stack.

FIG. 2 is a simplified exemplary protocol stack. Referring to FIG. 2, there is illustrated an exemplary Bluetooth® protocol stack 201. The exemplary Bluetooth® protocol stack 201 may comprise profiles layer 202, Bluetooth® management entity (BTM) layer 204, radio frequency communication (RFCOMM) protocol 206, audio/video distribution transport protocol (AVDTP) 207, service discovery protocol (SDP) 208, logical link control and adaptation protocol (L2CAP) 210, host controller interface (HCI) 212, and a lower stack 214. The profiles layer 202 may comprise profiles of one or more applications that may be utilized in connection with the Bluetooth® protocol stack. The BTM layer 204 makes it possible for various equipment to have wireless communication by integrating with a Bluetooth® module. The RFCOMM protocol 206 may be utilized to provide emulation of RS-232 serial ports over the L2CAP protocol, providing both transport capabilities for upper level services, such as OBEX, that use serial line as the transport mechanism.

The SDP 208 may be utilized for querying Bluetooth® device information, Bluetooth® device services, and characteristics of the services. The IL2CAP 210 may be utilized to support higher level protocol multiplexing, packet segmentation and reassembly, and quality of service (QoS). L2CAP 210 may permit higher-level protocols and applications to transmit and receive data packets up to 64 kilobytes in length. The HCI 212 may be adapted to provide a command interface to the baseband controller, link manager, and access to hardware status and control registers.

The Audio/Video Distribution Transport Protocol (AVDTP) 207 is the protocol designed especially for Bluetooth® streaming audio and video. It may perform the signaling that may be utilized to configure, open, and/or close a stream between two Bluetooth® devices. An Audio stream data may be transferred utilizing real-time protocol (RTP) packets. AVDTP resides in the protocol stack above L2CAP and may utilize separate L2CAP channels for signaling and data.

The tower stack 214 may comprise a link manager protocol (LMP) 215 and a link controller (LC) 217. The link manager (LM) 215 may be adapted to carry out link setup, authentication, link configuration and other protocols. The link manager 215 may also discover other remote LM's and communicates with them via the LMP. To perform its service provider role, the LM 215 may utilize the underlying Link Controller (LC) 217. The LMP essentially comprises a number of protocol data units (PDUs), which may be sent from one device to another, determined by an address in the packet header, for example. The LMP 215 may control the communication between various Bluetooth® enabled devices, such as a phone and a PC.

The LC 217 within the lower stack 214 may be adapted to handle Bluetooth® baseband functions, such as encoding of voice and/or data packets, error correction, slot delimitation, frequency hopping, radio interface, data encryption, and/or link authentication. In addition, the LC 217 may be adapted to execute link management software associated with the LMP 215. The link manager's control may include setting up the communication link and performing authentication, configuration, and other protocols, for example. In an exemplary embodiment of the invention, the lower stack 214 may comprise an advanced audio distribution profile (A2DP) utilizing SBC encoding or compression. In this regard, the A2DP implemented within the lower stack 214 may be adapted to handle audio data formatting, such as compression or encoding. Bluetooth® hardware implementations are typically highly integrated systems consisting of one or two chips.

Figure 3:
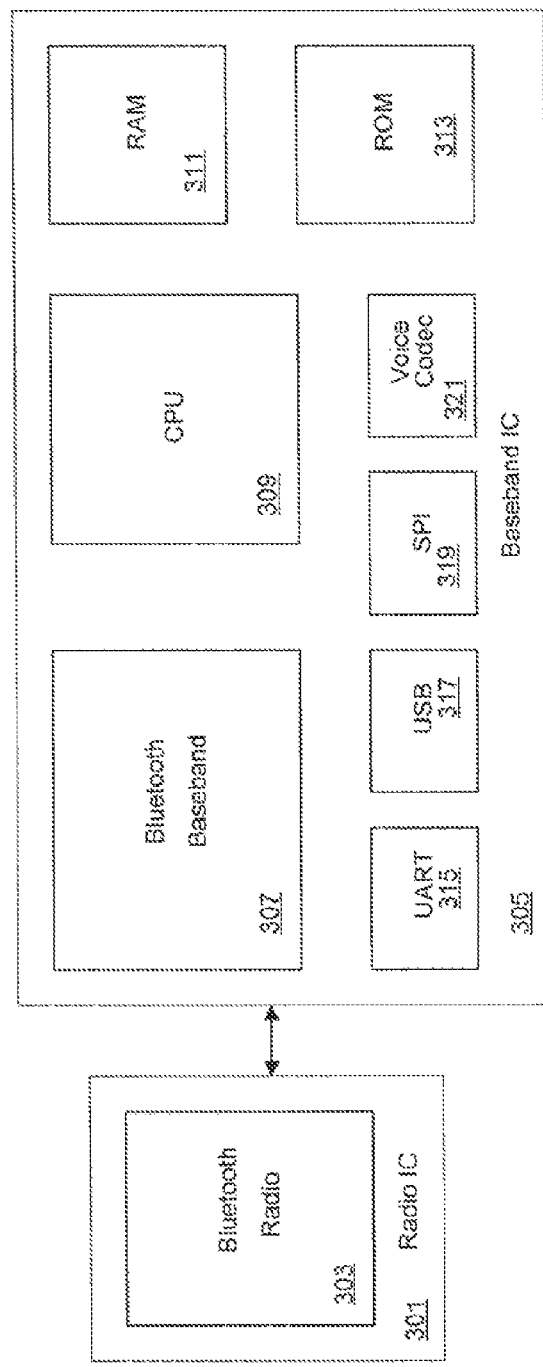
FIG. 3 is a block diagram illustrating an exemplary Bluetooth® hardware implementation.

FIG. 3 is a block diagram illustrating an exemplary Bluetooth® hardware implementation. Referring to FIG. 3, the Bluetooth® hardware implementation may comprise a Bluetooth® baseband integrated circuit (IC) 305 and a radio IC 301. The radio IC 301 may comprise a Bluetooth® radio circuit 303. The baseband IC 305 may comprise Bluetooth® baseband circuit 307, processor 309, random access memory (RAM) 311, read only memory (ROM) 313, voice CODEC 321, a serial peripheral interface (SRI) 319, universal serial bus (USB) 317, and universal asynchronous receiver/transmitter (UART) 315. The radio IC 301 may be implemented in a separate chip. The processor 309 may be adapted to operate all the required software including lower stack, upper stack, and embedded profile, for example. This type of single CPU implementation allows tier a small, low power, and low cost solution.

The 723 kbps throughput of a Bluetooth® link may be suitable for streaming audio utilizing MP3 and/or other coded formats. Bluetooth® streaming audio may be defined by three Bluetooth® specifications covering the protocol and profiles comprising AVDTP, GAVDP, and A2DP. The Audio/Video Distribution Transport Protocol (AVDTP) is the protocol designed especially for Bluetooth® streaming audio and video. It may perform the signaling that may be utilized to configure, open, and/or close a stream between two Bluetooth® devices. An Audio stream data may be transferred utilizing real-time protocol (RTP) packets. AVDTP resides in the protocol stack above L2CAP and may utilize separate L2CAP channels for signaling and data.

The Generic Audio/Video Distribution Profile (GAVDP) is an abstract profile that defines how applications can use AVDTP. The Advanced Audio Distribution Profile (A2DP) defines how Bluetooth® streaming audio applications may operate. For example, A2DP defines how to get and set audio CODEC parameters for MPEG and/or other codecs, The A2DP may also define the media payload formats for packaging audio stream data into packets and may contain the specification for the low-complexity sub-band CODEC (SBC). In this regard, the SBC may be implemented on-chip within the Bluetooth® baseband IC 305 and may be used for audio data compression of uncompressed data received from the radio IC 301. For example, the SBC may be implemented within the processor 309 or may be implemented outside the processor 309, as a separate compression acceleration block.

Figure 4:
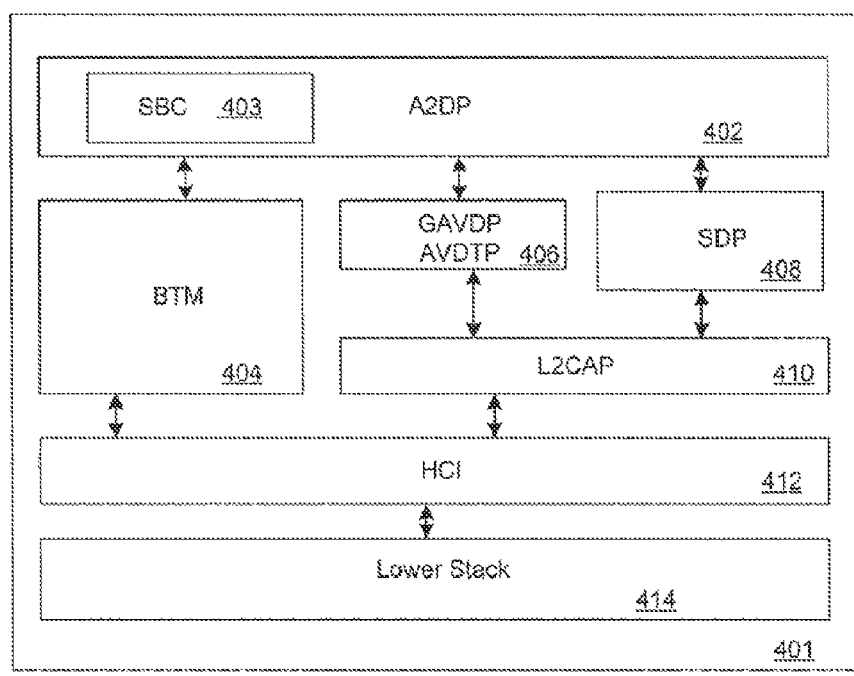
FIG. 4 is a block diagram illustrating a Bluetooth® protocol stack for streaming audio.

FIG. 4 is a block diagram illustrating a Bluetooth® protocol stack for streaming audio. Referring to FIG. 4, the Bluetooth® protocol stack for streaming audio 401 may comprise A2DP 402, Bluetooth® management entity (BTM) protocol 404, GAVDP/AVDTP 406, service discovery protocol (SDP) 408, logical link control and adaptation protocol (L2CAP) 410, host controller interface (HCI) 412, and a lower stack 414. In addition to the Bluetooth® specifications illustrated on FIG. 4, there are several ISO/IEC and Internet RFC specifications used for Bluetooth® streaming audio, which are summarized in Table 1.

TABLE 1

Additional specifications used for Bluetooth ® streaming audio

| Specification | Description |
| --- | --- |
| ISO/IEC 11172 part 3 | MPEG audio |
| ISO/EC 13818 part 3 | MPEG audio |
| ISO/IEC 13818 part 7 | MPEG advanced audio |
| ISO/IEC 14498 part 3 | MPEG advanced audio |
| RFC 1889 | Real-time protocol (RTP) |
| RFC 2733 | RTP error correction |
| RFC 3095 | Packet header compression |
| RFC 2250 | RTP payload format |
| RFC 3016 | RTP payload format |
| RFC 3119 | RTP payload format |

The A2DP 402 may comprise a low-complexity sub-band CODEC (SBC) 403. The SBC 403 may be utilized for audio data compression, or encoding of uncompressed data received from a Bluetooth® radio, for example. The bulk of the Bluetooth® streaming A/V system may be implemented in the AVDTP protocol.

Figure 5A:
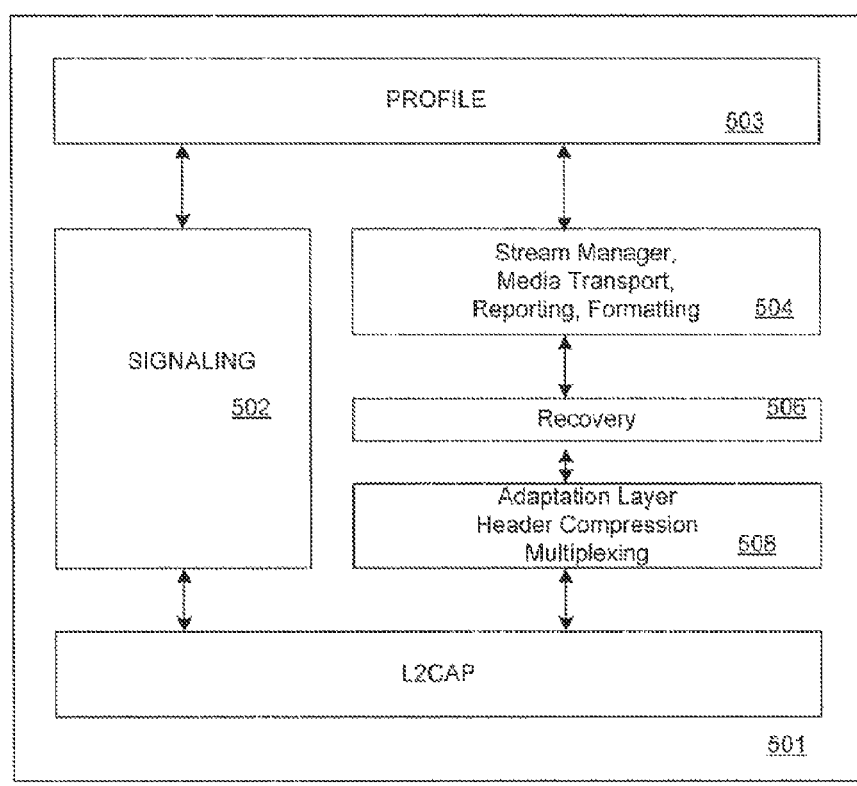
FIG. 5A is a block diagram illustrating AVDTP features.

FIG. 5A is a block diagram illustrating AVDTP features. Referring to FIG. 5A, the AVDTP may comprise a portion of the Bluetooth® protocol stack 501 located below a Bluetooth® protocol profile 503, such as an A2DP, and may be divided into four subsystems: signaling 502, stream management 504, recovery 506, and adaptation layer 508. AVDTP signaling messages 502 are used to discover, configure, open, and close a stream between two Bluetooth® enabled devices. There are eleven message types with some messages being optional.

A media transport feature of the stream manager 504 may be utilized to transfer RTP packets containing audio data. This feature is a required feature of AVDTP. The reporting feature of the stream manager 504 may allow link quality information, such as jitter and packet loss, to be exchanged utilizing the protocols defined in RFC 1889. This is an optional feature. The recovery feature 506 adds extra packets containing error correction data to the packet transfer. This feature may allow for lost packets to be recovered. The recovery mechanism is defined by RFC 2733. This is an optional feature and may require additional ROM and/or RAM.

A header compression feature of the adaptation layer 508 allows the RTP header to be compressed, as defined by RFC 3095. When used with AVDTP, the RTP header may be reduced by 5 to 7 bytes. This savings may probably not be worth the effort of implementing the feature especially when large media packets are used. A multiplexing feature of the AVDTP adaptation layer 508 allows L2CAP channels to be shared by media, reporting, and/or recovery packets, therefore resulting in fewer L2CAP channels and better baseband channel capacity utilization. This complex feature may be useful for devices that use multiple simultaneous streams with reporting and recovery.

In an exemplary embodiment of the invention, the AVDTP may also utilize data formatting functionalities. For example, the AVDTP may utilize an audio data formatting functionality within the stream manager 504. The formatting functionality may be used in accordance with on-chip compression of audio data via an SBC, for example. In this regard, the stream manager 504 may establish data formatting parameters, such as compression parameters for compressing audio data, and an SBC implemented within a Bluetooth® baseband IC may be used for audio data compression. Compressed audio data may then be communicated to a peer Bluetooth® enabled device.

Figure 5B:
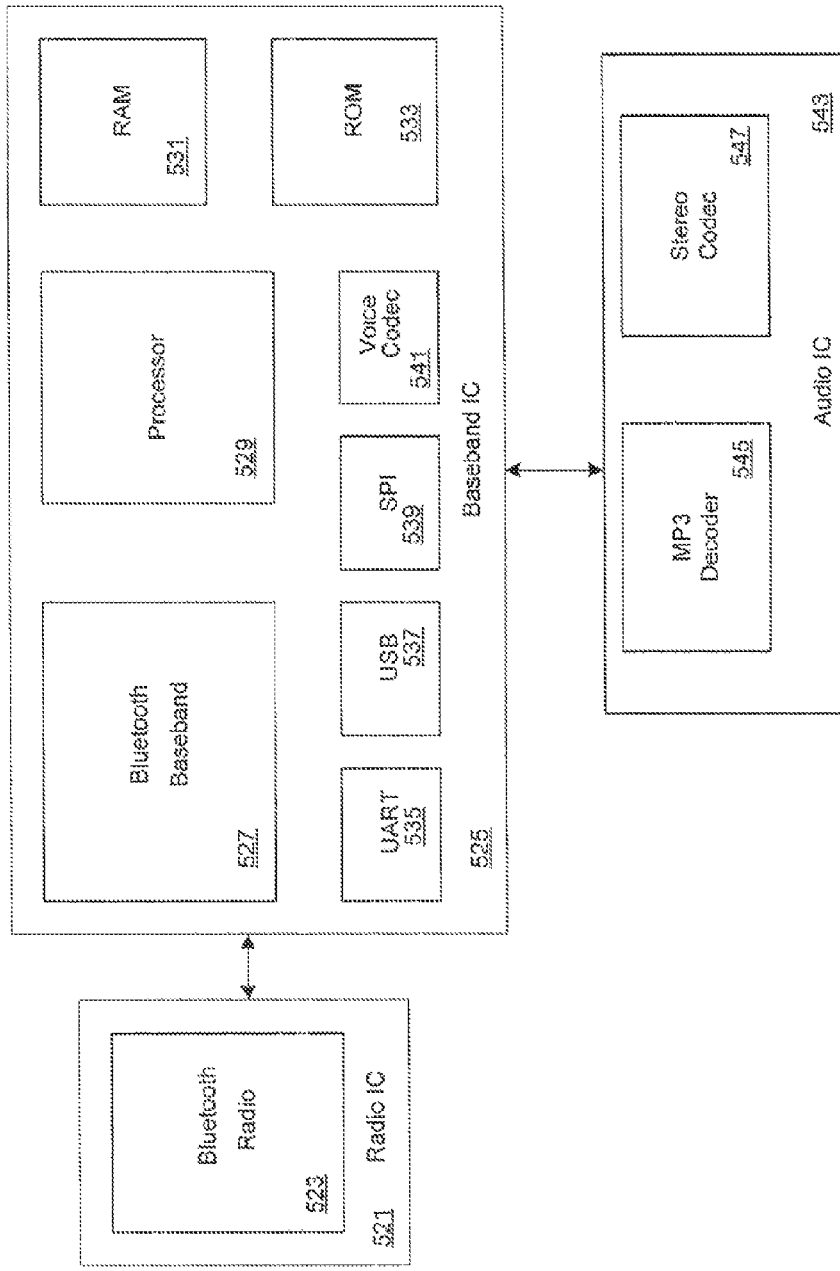
FIG. 5B is a block diagram illustrating an exemplary hardware implementation for streaming audio playback, in accordance with an embodiment of the invention.

FIG. 5B is a block diagram illustrating an exemplary hardware implementation for streaming audio playback, in accordance with an embodiment of the invention. Referring to FIG. 5B, the Bluetooth® hardware implementation for streaming audio playback may comprise a Bluetooth® baseband integrated circuit (IC) 525, a radio IC 521, and an audio IC 543. The radio IC 521 may comprise a Bluetooth® radio circuit 523. The audio IC 543 may comprise an MP3 decoder 545 and a stereo codec circuit 547. The baseband IC 525 may comprise Bluetooth® baseband circuit 527, the processor 529, random access memory (RAM) 531, read only memory (ROM) 533, voice codec 541, a serial peripheral interface (SPI) 539, universal serial bus (USB) 537, and universal asynchronous receiver/transmitter (UART) 535. The radio IC 521 and the audio IC 543 may be implemented in separate chips. The processor 529 may be adapted to operate all the required software including lower stack, upper stack, and embedded profile, for example. Data received over the Bluetooth® link may be processed by the protocol stack and passed to an application. The application may acquire the audio stream data and may communicate it over a hardware interface to the audio IC 543. The audio IC 543 may decode digital audio and may convert the audio signal to analog signal.

Implementing AVDTP with the minimum required features may require multiple streams support. For the simple streaming audio device examples shown in FIG. 1, optional features such as recovery, reporting, header compression, and multiplexing may not be required as Bluetooth® devices may be adapted to perform adequately without such features.

Maintaining a data transfer with a constant bit rate on a Bluetooth® link may be difficult to achieve. If data is sent too slowly, the audio decoder may run out of stream data to process, causing an audible error. Lost data packets may also cause the same problem. On the other hand, if data is sent too quickly, then data may be buffered up at the audio decoder, eventually causing congestion or data loss when the device runs out of buffer space. Since there is no flow control mechanism built into AVDTP or L2CAP, other mechanisms may be utilized to prevent data loss. The mechanism used by the audio source, or device sending the stream, may depend on the type of source. If the source is "live" and audio stream data is provided by an audio encoder, then the encoder itself may provide the constant bit rate. If the source is from a file, then a tinier may be utilized to maintain a constant bit rate.

To understand the idea behind using a timer, consider this example. A device is sending an MP3 stream from a file encoded at 128 kbps and 48 kHz sample frequency. Referring to Table 2a, this means an MP3 audio frame 384 bytes long is sent every 24.0 ms. If the device simply sets a periodic timer for 24.0 ms and sends a packet when the timer expires, the constant bit rate will be maintained.

TABLE 2a

Audio frame sizes for SBC and MP3.
Audio Frame Size vs. Data Rate and Sample Frequency

|  | SBC* | | | MP3 | | |
| --- | --- | --- | --- | --- | --- | --- |
|  | 64 kbps | 128 kbps | 320 kbps | 64 kbps | 128 kbps | 320 kbps |
| 48 kHz | 20 | 42 | 108 | 192 | 384 | 960 |
| 44.1 kHz | 22 | 46 | 118 | 209 | 418 | 1045 |
| 32 kHz | 32 | 64 | 162 | 228 | 576 | 1440 |

TABLE 2b

Audio frame periods for SBC and MP3.
Audio frame Period vs. Sample Frequency

|  | SBC* | MP3 |
| --- | --- | --- |
| 48 kHz | 2.667 ms | 24.0 ms |
| 44.1 kHz | 2.902 ms | 26.122 ms |
| 32 kHz | 4.0 ms | 36.0 ms |

SBC frames may be small with a short period, as illustrated in Table 2b with regard to several typical values for SBC and MP3 audio frame periods. Some devices may have problems using timers or processing data at such short intervals. This suggests that rather than send a small packet containing a single frame at very short intervals, a larger packet containing several frames at longer intervals may be communicated instead. The maximum size of MP3 frames may correspond to the L2CAP MTU of the AVDTP transport channel, such that audio frames may not need to be fragmented across AVDTP packets.

When more than one stream is transferred between devices, the stream playback may be synchronized. Consider the example of the wireless PC speakers shown in FIG. 1. The PC may communicate a Bluetooth® audio stream to each speaker. There are actually two synchronization problems in this example. First, the audio playback of the two speakers may need to be synchronized with each other. Second, the audio playback may need to be synchronized with the display on the PC. Although the Bluetooth® specifications do not cover synchronization issues, there are some features of the system that may be utilized to address these synchronization problems.

Figure 6:
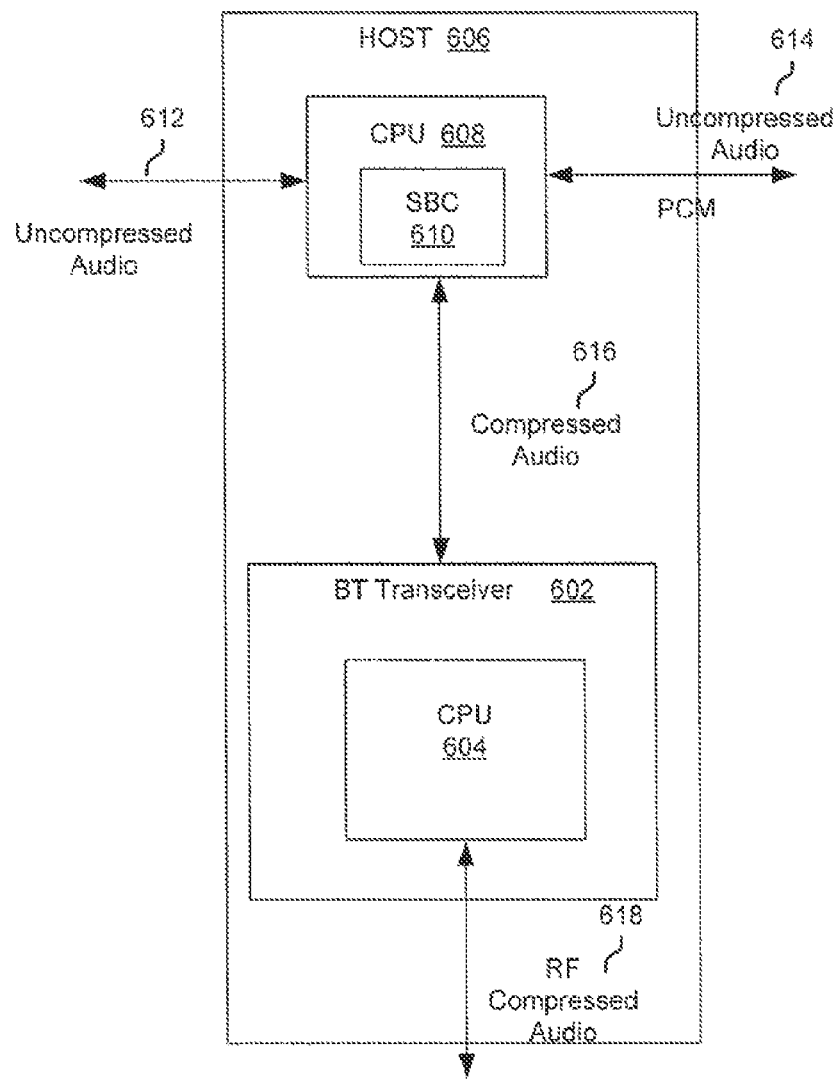
FIG. 6 is a block diagram illustrating audio signal processing within a Bluetooth® enabled host device, in accordance with an embodiment of the invention.

FIG. 6 is a block diagram illustrating audio signal processing within a Bluetooth® enabled host device, in accordance with an embodiment of the invention. Referring to FIG. 6, the Bluetooth® device or host 606 may comprise a central processing unit (CPU) 608 and a Bluetooth® transceiver 602. The CPU or processor 608 may utilize, for example, a low-complexity sub-band CODEC (SBC) block 610. The Bluetooth® transceiver 602 may comprise a CPU 604. The CPU 608 may be adapted to process uncompressed audio data. For example, the CPU 608 may be adapted to encode or compress uncompressed audio data utilizing the SBC block 610. The CPU 604 within the Bluetooth® transceiver 602 may be adapted to control processing of the required Bluetooth® software including the lower Bluetooth® protocol stack, the upper Bluetooth®, protocol stack, and/or an embedded profile, for example.

In operation, uncompressed audio data 612 may be received by the Bluetooth® enabled device 606. The Bluetooth® enabled device 606 may also be adapted to receive uncompressed input audio signals 614 from a standard pulse code modulation (PCM) wired CODEC interface, such as a standard hardware stereo PCM interface. Uncompressed audio data may be compressed by the CPU 608 utilizing the SBC block 610. Resulting compressed audio data 616 may be communicated from the SBC block 610 to the Bluetooth® transceiver 602. The resulting internally encoded audio data may be directly interfaced via the Bluetooth® protocol to externally enabled Bluetooth® devices. For example, a Bluetooth® radio such as Bluetooth® radio 523 within the Bluetooth® transceiver 602 may communicate the received compressed signal as compressed RF audio signal 618 to a peer Bluetooth® device, for example.

In an exemplary embodiment of the invention, processing resources of the host CPU 608 may be freed by moving SBC compression functionalities to the Bluetooth® transceiver 602. In this regard, SBC functionalities may be moved from the upper Bluetooth® protocol stack, such as the upper Bluetooth® A2DP, to a lower Bluetooth® protocol stack, such as a lower Bluetooth® A2DP.

Figure 7:
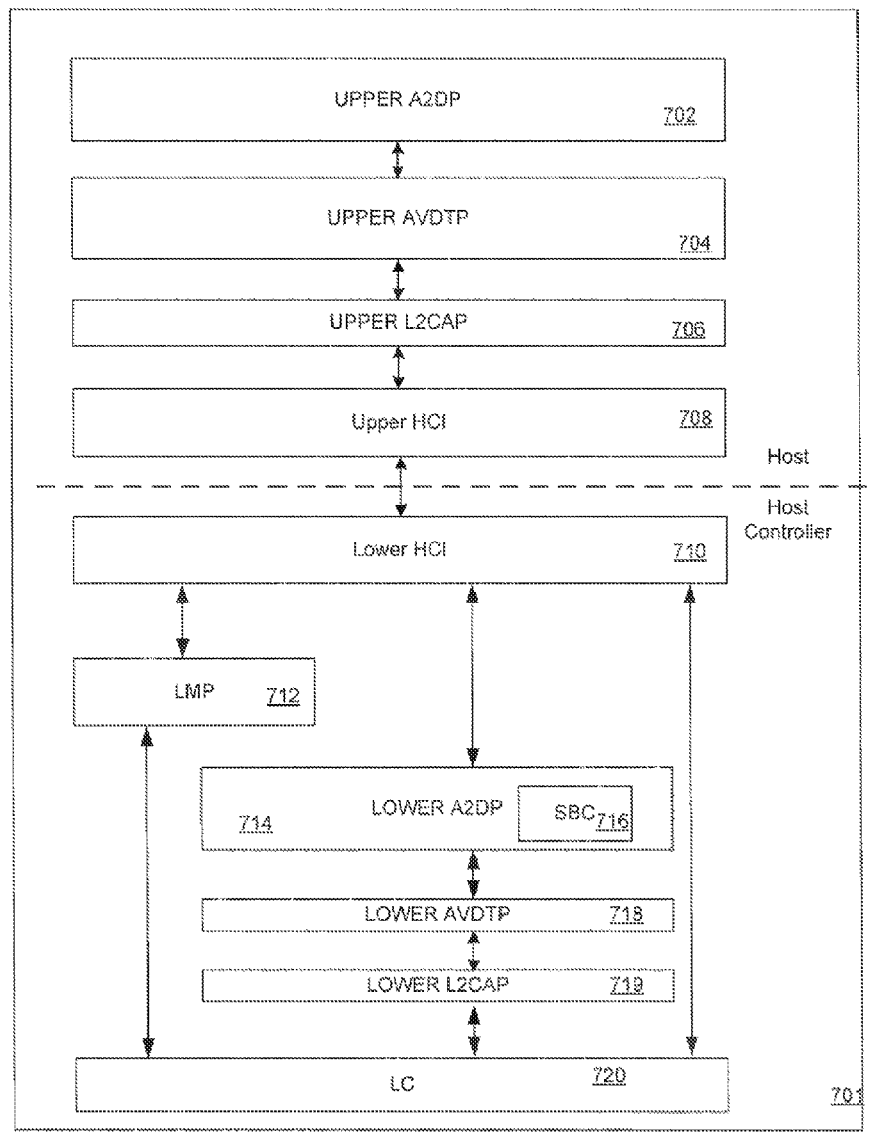
FIG. 7 is a block diagram of exemplary Bluetooth® protocol stack, in accordance with an embodiment of the invention.

FIG. 7 is a block diagram of exemplary Bluetooth® protocol stack, in accordance with an embodiment of the invention. Referring to FIGS. 6 and 7, the exemplary Bluetooth® protocol stack may comprise an upper Bluetooth® protocol stack and a lower Bluetooth® protocol stack. The upper Bluetooth® protocol stack may be implemented within the host 606 and may comprise an upper A2DP 702, an upper AVDTP 704, an upper L2CAP 706, and an upper HCI 708. The lower Bluetooth® protocol stack may be implemented within the Bluetooth® transceiver 602 and may comprise a lower HCI 710, an LMP 712, a lower A2DP, a lower AVDTP 718, a lower L2CAP 719, and an 720. The lower A2DP may comprise an SBC 716. The upper L2CAP 706, the upper HCI 708, the lower 710, the LMP 712, and the LC 720 may perform the same functionalities as described above with regard to FIGS. 2, 4, and 5A. The upper Bluetooth® protocol stack may be utilized to handle control signaling portion of the Bluetooth® protocol from the host, and the lower Bluetooth® protocol stack may be utilized to handle data processing/formatting portion of the Bluetooth® protocol from the host controller.

In an exemplary embodiment of the invention, the SBC block may be moved from the upper Bluetooth® protocol stack in the host 606 to the lower Bluetooth® protocol stack in the Bluetooth® transceiver 602. In this regard a lower A2DP 714 with the SBC 716 may be included as a protocol layer below the lower HCI 710. The lower A2DP 714 may be utilized to establish a signaling channel, for example, from the host device 606 to a peer Bluetooth® enabled device for communication of compressed audio data. The lower AVDTP 718 may be implemented as a Bluetooth® protocol layer below the lower A2DP 714 and may be utilized to provide fragmentation and assembly functionalities during processing of compressed audio data.

For example, compressed audio data may be further fragmented or combined together, based on the size of the compressed audio data packets. The lower AVDTP 718 may be utilized to compress a plurality of SBC packets into a single AVDTP packet and add a media payload header to the AVDTP packet. The lower L2CAP 719 may be utilized to support higher level protocol multiplexing, packet segmentation and reassembly, and quality of service (QoS) processing with regard to compressed audio frames processed by the lower A2DP 714 and the lower AVDTP 718 protocols. The lower L2CAP 719 may be adapted to verify the AVDTP packet (with a header) received from lower AVDTP 718, and to add an L2CAP header. The L2CAP packet and header may then be communicated to the LC 720 for further baseband processing and transmission.

Figure 8:
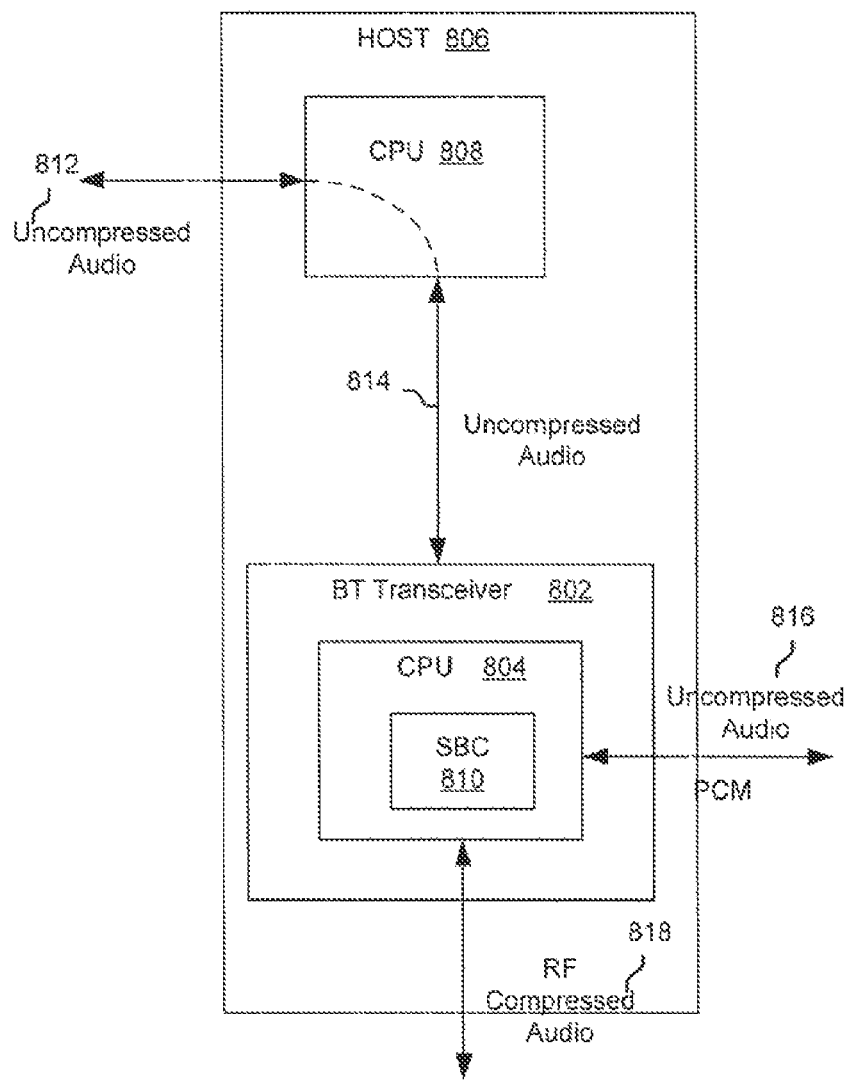
FIG. 8 is a block diagram illustrating audio signal compression within a Bluetooth® transceiver, in accordance with an embodiment of the invention.

Referring to FIGS. 7 and 8, the host device 806, which may be a Bluetooth® enabled host device, may be aware that the Bluetooth® transceiver 802 may be adapted to perform encoding or compression of audio frames. The Bluetooth® enabled host device may initially establish a connection to a peer Bluetooth® device utilizing standard Bluetooth® protocol and procedures. After a Bluetooth® connection is established between the Bluetoothe enabled host device 806 and a peer Bluetooth® device, the Bluetooth® enabled host device 806 may indicate to the Bluetooth® transceiver 802 that uncompressed audio data may be sent to the Bluetooth® transceiver 802 via a special L2CAP channel with a specific L2CAP channel ID (CM). Such notification may be accomplished via a vendor specific command, for example, of the upper HCI 708 and/or the lower HCI 710.

The Bluetooth® enabled host device 806 may then pass to the Bluetooth® transceiver 802 control information which may be utilized for SBC compression, as well as to build AVDTP and L2CAP packets for the lower AVDTP 718 and the lower L2CAP 719. Such control information may comprise, for example, SBC parameters and/or A2DP/AVDTP headers negotiated during the establishment of the Bluetooth® connection. When the Bluetooth® transceiver 802 receives the next HCI packet from the lower HCI 710, the Bluetooth® transceiver 802 may check whether the HCI packet belongs to a special L2CAP CID. If the HCI packet does not belong to a special L2CAP CID, the HCI packet may be delivered directly from the lower 710 to the LC 720. If the HCI packet belongs to a special L2CAP CID, the Bluetooth® transceiver 802 may combine the fragments of the L2CAP packet from the upper L2CAP 706 and may pass it to the lower A2DP 714 and the SBC 716 for compression. Compressed packets may be communicated to the lower AVDTP 718 for delivery. The lower AVDTP 718 may add required headers to the received packets and may communicate the resulting headers and packets to the lower L2CAP 719. The lower L2CAP 719 may add L2CAP headers and the resulting packets and headers may be communicated to the LC 720.

Even though SBC encoding is utilized for audio compression, the present invention may not be so limited and other methods of encoding, such as MP3 or AAC, for example, may be also utilized.

FIG. 8 is a block diagram illustrating audio signal compression within a Bluetooth® transceiver, in accordance with an embodiment of the invention. Referring to FIG. 8, the Bluetooth® device or host 806 may comprise a central processing unit (CPU) 808 and a Bluetooth® transceiver 802. The Bluetooth® transceiver 802 may comprise a CPU 804 and the CPU 804 may utilize a low-complexity sub-band CODEC (SBC) block 810. The CPU 804 may be adapted to process uncompressed audio data received from the CPU 808. For example, the CPU 804 may be adapted to encode or compress uncompressed audio data utilizing the SBC block 810. Furthermore, the CPU 804 within the Bluetooth® transceiver 802 may be adapted to operate all the required Bluetooth® software including the lower Bluetooth® protocol stack, the upper Bluetooth® protocol stack, and/or an embedded profile, for example.

In operation, uncompressed audio data 812 may be received by the Bluetooth® enabled device 806. The uncompressed audio data may then be communicated to the Bluetooth® transceiver 802 via connection 814. The uncompressed audio data may be compressed by the CPU 804 within the Bluetooth® transceiver 802 utilizing the SBC block 810. The Bluetooth® transceiver 802 may be also adapted to receive uncompressed input audio signals 816 via a standard pulse code modulation (PCM) wired CODEC interface, such as a standard hardware stereo PCM interface. The resulting internally encoded audio data may be directly interfaced via the Bluetooth® protocol from the Bluetooth® transceiver 802 to externally enabled Bluetooth® devices. For example, a Bluetooth® radio such as the Bluetooth® radio 523 of FIG. 5B, which is located within the Bluetooth® transceiver 802 may communicate the compressed audio signal as RF compressed audio signal 818 to a peer Bluetooth® device, for example.

Even though a PCM interface is utilized to receive uncompressed input audio signals, the present invention may not be so limited and other types of interfaces, such as 12S or another hardware interface may be also utilized to receive uncompressed input audio signals.

Figure 9:
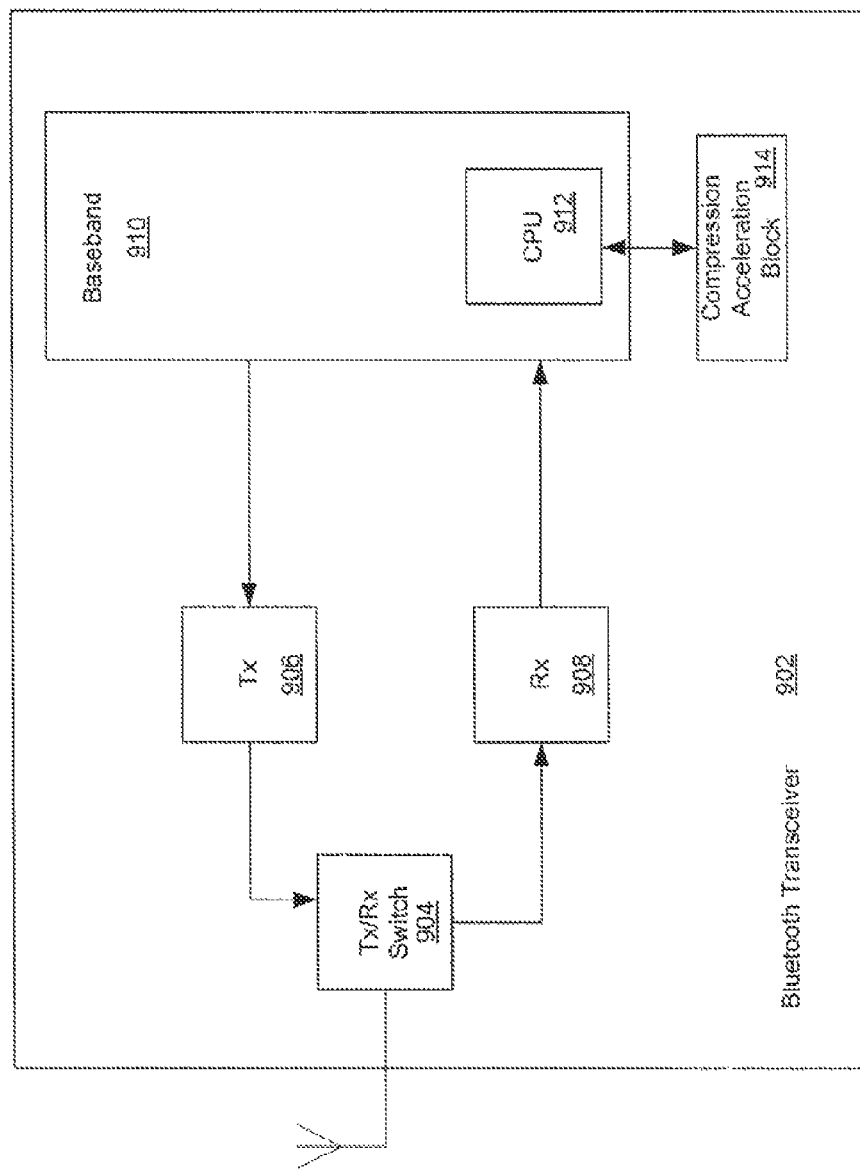
FIG. 9 is a block diagram of exemplary Bluetooth® transceiver utilizing audio signal compression, in accordance with an embodiment of the invention.

FIG. 9 is a block diagram of exemplary Bluetooth® transceiver utilizing audio signal compression, in accordance with an embodiment of the invention. Reaming to FIG. 9, the Bluetooth® transceiver 902 may comprise a transmit/receive switch 904, a transmitter (Tx) block 906, a receiver (Rx) block 908, a baseband processing block 910 and a compression acceleration block 914. The baseband processing block 910 may comprise a CPU 912. The functionalities of the baseband processing block 910 and the CPU 912 may be the same as the functionalities of the baseband IC 305 and the processor 309, as described above with regard to FIG. 3.

The compression acceleration block 914 may comprise suitable circuitry, logic, and/or code and may be adapted to compress audio data received from the baseband processing block 910. In one embodiment of the invention, the compression acceleration block 914 may comprise a digital signal processor implementing a low-complexity sub-band CODEC, for example.

In another embodiment of the invention, the Bluetooth® transceiver chip 902 may comprise an on-chip audio codec within the CPU 912, that compresses received audio information on-chip. The audio codec within the CPU 912 may comprise a low complexity sub-band codec (SBC), for example. The Bluetooth® transceiver chip 902 may receive an audio stream comprising audio information, via a protocol stack that is external to the Bluetooth® transceiver chip 902. The received audio stream may be generated via an audio/video distribution transport protocol (AVDTP) within the protocol stack that is external to the Bluetooth® transceiver chip 902. A data channel may be established between the Bluetooth® transceiver chip 902 and a peer Bluetooth® device, for communicating the established audio stream to the Bluetooth® transceiver chip 902 for compression. The data channel may be established utilizing a logical link control and adaptation protocol (L2CAP) and/or an advanced audio distribution profile (A2DP) within the protocol stack that is external to the Bluetooth® transceiver chip 902.

The Bluetooth® transceiver chip 902 may determine on-chip, a frame size of at least one audio frame comprising the compressed audio information. Exemplary SBC audio frame sizes are listed in Table 2a herein above. The Bluetooth® transceiver chip 902 may format on-chip, audio frames comprising the compressed audio information based on a determined frame size. The Bluetooth® transceiver chip 902 may format the audio frames on-chip by fragmenting the audio frames and/or by combining a plurality of the audio frames. The Bluetooth® transceiver chip 902 may format, the audio frames on-chip via the audio/video distribution transport protocol (AVDTP). The Bluetooth® transceiver chip may acquire the audio information on-chip via a pulse code modulation (PCM) wired connection.

Figure 10:
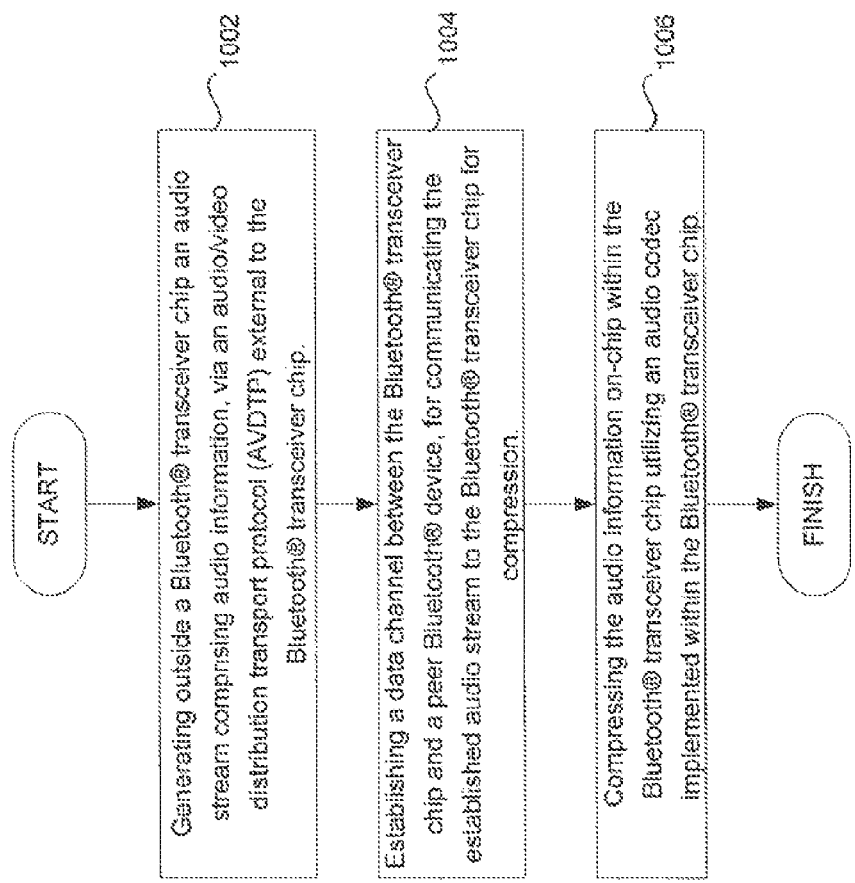
FIG. 10 is a flow diagram illustrating exemplary steps for processing data within a Bluetooth® device, in accordance with an embodiment of the invention.

FIG. 10 is a flow diagram illustrating exemplary steps for processing data within a Bluetooth® device, in accordance with an embodiment of the invention. Referring to FIGS. 8 and 10, at 1002, audio stream 812 comprising audio information may be generated outside a Bluetooth® transceiver chip 802, via an audio/video distribution transport protocol (AVDTP) external to the Bluetooth® transceiver chip 802. At 1004, a data channel may be established via the Bluetooth® transceiver chip 802 between a Bluetooth® enabled device and a peer Bluetooth® device, for communicating the established audio stream 812 to the Bluetooth® transceiver chip 802 for compression. At 106, the uncompressed audio information 812 may be compressed on-chip within the Bluetooth® transceiver chip 802 utilizing an audio CODEC, such as the SBC 810 implemented within the Bluetooth® transceiver chip 802.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing data, the method comprising:
    compressing, via an on-chip audio codec, audio information received by a transceiver chip to generate compressed audio information;
    generating at least one audio frame based on said compressed audio information; and
    determining, within said transceiver chip, a frame size and a frame period of the at least one audio frame based on a data rate and a sample frequency,
    wherein said on-chip audio codec is implemented within at least one on-chip processor of the transceiver chip.

2. The method according to claim 1, wherein said audio codec comprises a low complexity sub-band codec (SBC).

3. The method according to claim 2, comprising establishing a data channel by said transceiver chip between a host device and a peer wireless device, for communicating said established audio stream to said transceiver chip for compression.

4. The method according to claim 3, wherein said transceiver chip comprises a Bluetooth transceiver chip, and the method comprises establishing said data channel utilizing one or both of a logical link control and adaptation protocol (L2CAP) and/or an advanced audio distribution profile (A2DP).

5. The method according to claim 1, comprising generating outside said transceiver chip an audio stream comprising said audio information, wherein said audio stream is generated via an audio/video distribution transport protocol (AVDTP) external to said transceiver chip.

6. The method according to claim 1, comprising formatting within said transceiver chip said at least one audio frame, based on said determined frame size, wherein the data rate and the sample frequency correspond to an encoded file that is a source of the audio information, and further comprising utilizing said determined frame size and a frame period to maintain a constant data transfer to an audio decoder.

7. The method according to claim 6, wherein said formatting comprises one or both of fragmenting said at least one audio frame and/or combining a plurality of said at least one audio frame.

8. The method according to claim 6, comprising formatting said at least one audio frame via an audio/video distribution transport protocol (AVDTP) implemented within said transceiver chip.

9. The method according to claim 1, comprising acquiring, from outside said transceiver chip, said audio information via a pulse code modulation (PCM) wired connection.

10. A system for processing data, the system comprising:
    a transceiver chip configured to receive audio information;
    at least one on-chip processor within said transceiver chip; and
    an on-chip audio codec implemented within said at least one on-chip processor and configured to compress the audio information to generate compressed audio information,
    wherein said at least one processor is configured to enable determining, within said transceiver chip, a frame size and a frame period of at least one audio frame generated based on the compressed audio information, wherein the frame size and the frame period are determined based on a data rate and a sample frequency.

11. The system according to claim 10, wherein said audio codec comprises a low complexity sub-band codec (SBC).

12. The system according to claim 10, wherein said at least one processor is configured to enable receiving an audio stream comprising said audio information, via a protocol stack that is external to said transceiver chip, wherein said received audio stream is generated via an audio/video distribution transport protocol (AVDTP) within said protocol stack that is external to said transceiver chip.

13. The system according to claim 10, wherein said at least one processor enables establishing a data channel between a host device and a peer wireless device, for communicating said established audio stream to said transceiver chip for compression.

14. The system according to claim 13, wherein said transceiver chip comprises a Bluetooth transceiver chip, and wherein said data channel is established utilizing one or both of a logical link control and adaptation protocol (L2CAP) and/or an advanced audio distribution profile (A2DP) within said protocol stack that is external to said transceiver chip.

15. The system according to claim 10, wherein said at least one processor enables formatting on-chip, of at least one audio frame comprising said compressed audio information based on the determined frame size, wherein the data rate and the sample frequency correspond to an encoded file that is a source of the audio information, and wherein said determined frame size and a frame period is utilized to maintain a constant data transfer to an audio decoder.

16. The system according to claim 15, wherein said at least one processor enables formatting said at least one audio frame on-chip by one or both of fragmenting said at least one audio frame and/or combining a plurality of said at least one audio frames.

17. The system according to claim 15, wherein said at least one processor enables formatting on-chip, of said at least one audio frame via an audio/video distribution transport protocol (AVDTP).

18. The system according to claim 10, wherein said at least one processor enables acquiring on-chip, said audio information via a pulse code modulation (PCM) wired connection.

19. A non-transitory computer-readable medium encoded with computer executable instructions for processing data to perform:
- compressing, using an on-chip audio codec, audio information received by a transceiver chip to generate compressed audio information;
- generating at least one audio frame based on said compressed audio information; and
- determining, within said transceiver chip, a frame size and a frame period of the at least one audio frame based on a data rate and a sample frequency,
- wherein said on-chip audio codec is implemented within at least one on-chip processor of the transceiver chip.

20. The non-transitory computer-readable medium according to claim 19, comprising code for establishing a data channel via said transceiver chip between a host device and a peer wireless device, for communicating said established audio stream to said transceiver chip for compression, wherein said transceiver chip comprises a Bluetooth transceiver chip.

* * * * *